(12) United States Patent
Fisher

(10) Patent No.: US 6,876,379 B1
(45) Date of Patent: Apr. 5, 2005

(54) MOBILE COMMUNICATIONS

(75) Inventor: Graham Fisher, Bath (GB)

(73) Assignee: Orange Personal Communications Services Limited, Bristol (GB)

(*) Notice: Subject to any disclaimer, the term of this patent is extended or adjusted under 35 U.S.C. 154(b) by 367 days.

(21) Appl. No.: 10/148,508

(22) PCT Filed: Nov. 24, 2000

(86) PCT No.: PCT/GB00/04482

§ 371 (c)(1),
(2), (4) Date: Sep. 23, 2002

(87) PCT Pub. No.: WO01/39497

PCT Pub. Date: May 31, 2001

(30)  Foreign Application Priority Data

Nov. 24, 1999 (GB) ............................................. 9927796

(51) Int. Cl.[7] ................................................ H04N 7/14
(52) U.S. Cl. ............................... 348/14.02; 348/14.01; 348/207.99; 455/550.1
(58) Field of Search .......................... 348/14.01–14.16, 348/207.99, 211.1, 211.2, 211.12; 455/550.1, 556.1; 386/117

(56)  References Cited

U.S. PATENT DOCUMENTS

| 5,414,444 A | 5/1995 | Britz |
| 5,491,507 A | 2/1996 | Umezawa et al. |
| 5,612,732 A | 3/1997 | Yuyama et al. |
| 5,815,759 A | 9/1998 | Tseng et al. |
| 6,532,035 B1 * | 3/2003 | Saari et al. ............... 348/14.02 |
| 6,559,881 B1 * | 5/2003 | Vooi-Kia et al. .......... 348/14.08 |

FOREIGN PATENT DOCUMENTS

| JP | 07212253 A | * | 8/1995 | ........... H04B/1/034 |
| JP | 9-130489 | | 5/1997 | |
| JP | 10-75287 | | 3/1998 | |
| JP | 10-98637 | | 4/1998 | |
| JP | 10-215396 | | 8/1998 | |
| JP | 10-301162 | | 11/1998 | |
| JP | 11112860 A | * | 4/1999 | ........... H04N/5/225 |
| JP | 11-187291 | | 7/1999 | |
| JP | 11-258657 | | 9/1999 | |
| WO | WO 95/20296 | | 7/1995 | |
| WO | WO 97/26744 | | 7/1997 | |

* cited by examiner

Primary Examiner—Wing F. Chan
(74) Attorney, Agent, or Firm—Knobbe Martens Olson & Bear LLP

(57)  ABSTRACT

A mobile videophone capable of transmitting and receiving information in mobile telecommunications systems, particularly cellular radio networks. The videophone includes a first portion and a second portion, the second portion being rotatable with respect to the first portion, the second portion including a camera for image capture, the camera including a lens, the second portion being rotatable with respect to the first portion from a first position, in which the camera lens is protected by said first portion, to a second position in which the first portion does not protect the camera lens.

31 Claims, 2 Drawing Sheets

MOBILE COMMUNICATIONS

This is a national phase application, filed under 35 U.S.C. §371, of International Application No. PCT/GB00/04482, filed on Nov. 24, 2000, which was published in English, and which claims priority of British Application No. GB 9927796.4, filed on Nov. 24, 1999.

FIELD OF THE INVENTION

The invention relates to a portable image capture device including a first portion and a second portion, the second portion being rotatable with respect to the first portion, the second portion including a camera for image capture. More specifically but not exclusively, the invention relates to portable videophones capable of receiving and transmitting information in mobile telecommunications systems, such as cellular radio networks. Such devices may be referred to as mobile videophones.

The inclusion of a video camera and display in a mobile telephone handset so as to allow mobile video-conferencing has been proposed in various documents.

U.S. Pat. No. 5,414,444 (AT&T) describes a communicator having an openable cover which contains an LCD-type display and a video camera. In this document, the video camera is reorientable when the cover is open, and the communicator includes mechanical apparatus interactive with the closing of the cover to reset the camera to a standard position after use.

A further form of mobile videophone is proposed in PCT publication number WO97/26744. This documents describes a portable telephone having a display and a camera mounted in the main body of the phone. The camera is mounted on a rotational pivot to enable it to receive images from various directions.

SUMMARY OF CERTAIN INVENTIVE ASPECTS

According to one aspect of the invention there is provided a portable image capture device including a first portion and a second portion, the second portion being rotatable with respect to the first portion, the second portion including a camera for image capture, the camera including a lens, the first portion including a display for viewing images captured by the camera, the second portion being rotatable with respect to the first portion from a first position, in which the camera lens is protected by said first portion, to a second position in which the first portion does not protect the camera lens, the device including means responsive to rotation of said first portion with respect to said second portion, the means being responsive to rotation of said second portion beyond a predetermined position to invert an image produced by said camera.

According to a further aspect of the invention there is provided a portable image capture device including a first portion and a second portion, the second portion being rotatable with respect to the first portion, the second portion including a camera for image capture, the second portion being rotatable with respect to the first portion from a first position to a second position, wherein said device includes means responsive to rotation of said first portion with respect to said second portion from said first position to switch on said camera, said responsive means being responsive to rotation of said second portion beyond a predetermined position to invert an image produced by said camera.

According to a further aspect of the invention there is provided a mobile videophone including a main body portion and a camera housing which is rotatably mounted on the main body portion, the main body portion being generally elongate and having a top, a lower end, two sides and a front surface on which a display is mounted, said housing being mounted on one of said sides, the videophone including means responsive to rotation of the camera housing with respect to the main body portion beyond a predetermined position to invert an image produced by the videophone.

BRIEF DESCRIPTION OF THE DRAWINGS

Aspects and advantages of the invention will be apparent from the following, in which an embodiment of the invention will now be described, by way of example only, with reference to the accompanying drawings in which.

DETAILED DESCRIPTION OF CERTAIN INVENTIVE EMBODIMENTS

Figure 1:
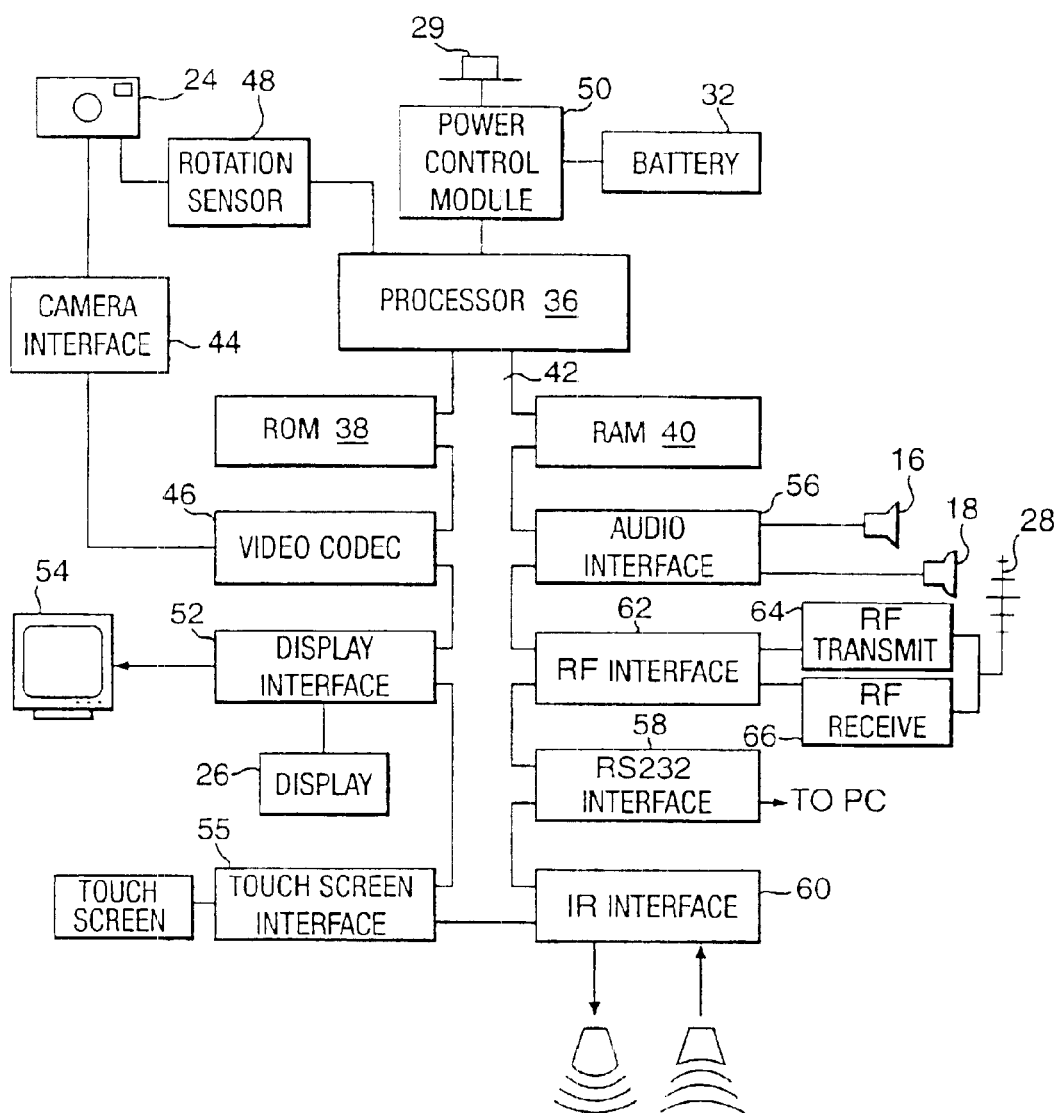
FIG. 1 is a schematic block diagram of the functional elements of a videophone in accordance with an embodiment of the invention.

FIG. 1 shows a schematic block diagram of the main functional elements which may be included commonly to the different embodiments of the invention, which elements are each individually known and will not be described in detail herein. A main processor 36 may be a conventional programmable microprocessor, or a special purpose or specially configured unit (e.g. a digital signal processor) could alternatively be used. A read-only memory (ROM) 38 is connected to the processor 36 for the storage of control programs, data and images. The ROM 38 can be implemented by any appropriate technology, for example, by a flash PROM. A random-access memory (RAM) 40 is connected to the processor 36 via a bus 42, is used as a working storage and for the storage of data and images captured using a CCD video camera 24.

Signals relating to the data captured by the camera are passed via a camera interface 44 to the processor 36 to be processed. The camera interface 44 also provides the video codec 46 with a digital representation of the captured data from the camera 24, where it can be suitably processed for display and/or transmission to the mobile communications system. An indicator light may be connected to the processor to report successful capture of data and/or images from the camera 24 and may also be used during video conferencing to indicate the correct usage of the device.

The camera interface 44 carries out all the necessary signal conditioning as required on receiving images from the camera 24. Signal conditioning will depend on the exact configuration of the camera but preferably comprises signal conditioning to enable accurate analogue to digital conversion with sufficient buffering of the captured data. The camera 24 will include all the necessary support circuitry to produce a fully functional camera delivering a fully formatted video signal. The camera 24 may also include circuitry to regulate the voltage for power supply control and a suitable output buffer to directly drive a standard VDU should the videophone be connected to an external device.

The camera 24 is rotatably mounted on the videophone to allow adjustment of the orientation of the camera to enable the user to point the camera in alternative directions. The positioning of the camera 24 can be adjusted manually. The rotational position of the camera is detected by a rotation sensor, which feeds an output to the processor 36 whereby operation of the camera may be controlled in dependence on the rotational position of the camera. The processor 36 may switch the camera on in response to rotational movement of the camera. The processor may also control an image manipulation to flip an image produced by the camera in response to detection of the camera in a certain rotational position or range of positions. Such an image inversion is preferably performed by means of software-based data processing in the videophone before the image data is transmitted to the other party.

The on/off button 29 is connected via a suitable interface to a power control module 50. The power control module 50 responds to the operation of this button in a powered down state to connect the battery 32 to the processor 36. The power control module 50 may also control the charging of the battery 32. The power control module 50 will also control the power requirements when a standard AC/DC power supply is connected to the videophone.

A display interface 52 connects a graphics display 26 via the bus 42 to the processor 36. The display interface 52 responds to instructions from the processor 136 to drive the built-in display 26 in a conventional manner. The display interface 52 may also incorporate the necessary circuitry to drive a standard external video display unit via a suitable connector 54. The display is capable of displaying still and/or video images captured by the camera 24.

The display 26 is provided with a touch-screen. A touch-screen interface 55 couples the touch-sensitive display 26 to the processor 36 via the bus 42. The touch-screen is a device independent of the video display 26, for example, a transparent touch-screen membrane is placed over the display 26 and connected appropriately.

The processor 36 can be arranged to transmit to the display 26 a menu of user selectable items, and to be responsive to a location at which the screen is touched for input of the user selection of an item. The touch-sensitive screen can then thus be used as a dynamic and reconfigurable user interface. Touch-screen entry can be used in place of or in addition to the entry's commands from an external keyboard or voice command if appropriate. Additionally, the touch-screen area can be configured as a general purpose scribing area to allow entry of data and written commands.

An audio interface 56 connects the audio receiver means, consisting of one or more microphones 18 and audio transmitter means such as one or more ear-pieces and/or speakers 16 to the processor 36 and carries out all the necessary signal conditioning as required to output audio signals and to receive audio signals.

The videophone includes infra-red data reception and transmission capabilities and a suitable infra-red interface 60 is provided. The infra-red interface connects an infra-red port to the processor 36 via the bus 42.

A radio-frequency (RF) interface 62 is also connected via the bus 42 to convert any data to be transmitted into signals for driving an RF transmitter 64, and converts signals from an RF receiver 66 into data to be passed via the bus to the relevant interfaces. The RF transmitter 64 and the RF receiver 66 are connected to a radio antenna 28. This RF interface 62 consequently enables wireless communications between the videophone and the mobile communications system, to allow the transmission and reception of still and/or video images to and from other similar videophones via the mobile communications system.

The processor 36 is programmed by means of control programs and data stored in the ROM 38 and in use, the RAM 40, to receive signals from the camera 24 via camera interface 44, to interpret those signals and to derive data therefrom which are displayed on display 26 and which can be stored in the RAM 40 or any other suitable memory device.

Other interfaces may be included to increase the flexibility of the unit, for example, RS232 interface 58 may be included, for transmitting and receiving data in RS232 format. The RS232 interface enables the processor 36 to be connected via the bus 42 to allow the connection of other compatible devices to the videophone through a standard RS232 cable.

Depending on the refresh rate used and the number of pixels used in the images, video image data transmitted and received by the videophone may require compression for transfer via a low data rate radio channel, such as those currently available in known cellular radio networks. The video data may be compressed using the MPEG-4 standard. Alternatively, the video images captured may be compressed into a different format suitable for transmitting the data derived across the mobile communications system, such as that disclosed in International Patent Publication WO95/20296.

Figure 2:
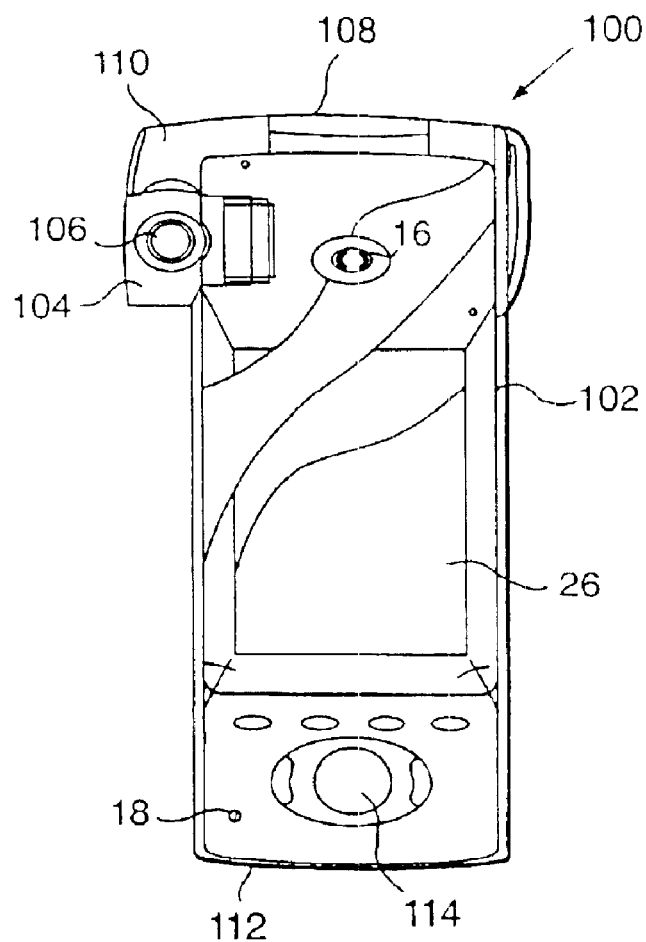
FIG. 2 is a plan view of an embodiment of videophone in accordance with the invention.

FIG. 2 is a plan view from above of an embodiment of a portable videophone 100 in accordance with the invention. The videophone includes a main body portion 102 housing the display 26 on its front surface. A generally cylindrical camera housing 104 is rotatably mounted to the body portion 102. The camera is housed behind a lens 106 which is built in to the housing 104. The body portion 102 is generally elongate and has an upper end 108, in the area of which the housing 104 projects from the left side of the body 102. A protective shoulder 110 located at the upper end 108 projects from the same side of the body 102 above the housing 104, and is arranged to fit flush with the upper surface of the projecting part of the housing 104. An earpiece housing a loudspeaker 16 is located on the front surface of the body 102 in the area of the upper end 108. The body 102 has a lower end 112 in the area of which a mouthpiece housing a microphone 18 and control buttons 114 are located.

The housing 104 is rotatable about an axis generally perpendicular to the upper end 108 of the body 102, from a protected position in which the camera is directed towards the upper end 108 and the lens is hidden behind the shoulder 110, clockwise (when viewed from the left side of the body 102) through a position in which the camera is directed towards the front of the body 102, a position in which the camera is directed towards the lower end 112, and a position in which the camera is directed towards the rear of the body 102. The housing is thus rotatable through at least 270 degrees.

Figure 3:
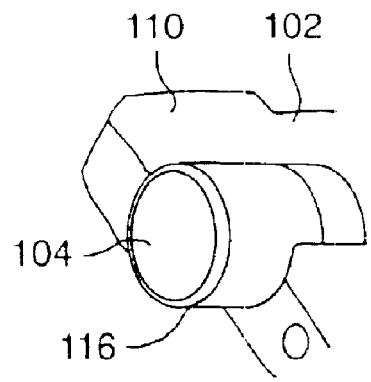
FIG. 3 is a detailed perspective view of a camera portion of the videophone shown in FIG. 2.

The shoulder 110 generally protects the housing 104, and in particular acts as a rigidly mounted lens cap to protect the camera lens 104 when the housing is rotated to the protected position, which is shown in greater detail in FIG. 3. As further shown in FIG. 3, the housing 104 also includes a frictional contact means 116, producing greater frictional force on manual manipulation than the remainder of the housing 104, at the outer periphery of the housing 104. The frictional contact means may for example be in the form of a rubber o-ring securely held on the housing 104.

The rotation sensor 48 is capable of sensing when the housing 104 is located in the protected position, in response to which the processor 36 may automatically switch off the camera 24. Similarly, when the housing 104 is rotated from the protected position, the processor may automatically switch on the camera 24. Furthermore, the rotation sensor 48 is capable of sensing when the camera is directed towards the rear of the body portion, in response to which the processor may initiate an image inversion, or flip, to be carried out at the camera interface 44 or the video codec 46 before the image is coded by the codec 46.

The invention is not limited in application to videophones. Aspects of the invention may be implemented in other types of portable devices, such as still and video cameras.

It is to be understood that the embodiments described above are preferred embodiments only. Namely, various features may be omitted, modified or substituted by equivalents without departing from the scope of the present invention, which is defined in the accompanying claims.

What is claimed is:

1. A portable image capture device including a first portion and a second portion, the second portion being rotatable with respect to the first portion, the second portion including a camera for image capture, the camera including a lens, the first portion including a display for viewing images captured by the camera, the second portion being rotatable with respect to the first portion from a first position, in which the camera lens is protected by said first portion, to a second position in which the first portion does not protect the camera lens, the device including a processing device responsive to rotation of said second portion with respect to said first portion, the processing device being responsive to rotation of said second portion beyond a predetermined position to invert an image produced by said camera.

2. A device according to claim 1, wherein the camera lens is protected by a protective portion of said first portion in the first position.

3. A device according to claim 2, wherein the protective portion is rigidly mounted to said first portion.

4. A device according to claim 2, wherein the protective portion is integrally formed on the fist portion.

5. A device according to claim 2, wherein the second portion is mounted to a side of the first portion, the second portion projecting from the side of the first portion and the protective portion also projecting from the side of the first portion.

6. A device according to claim 1, wherein the first portion is generally elongate having an upper end and a lower end, said second portion being mounted in the area of said upper end.

7. A device according to claim 6, wherein the first position is a position in which said camera faces in a direction of said upper end with respect to said lower end.

8. A device according to claim 1, wherein said processing device being responsive to rotation of said second portion from said first position to switch on said camera.

9. A device according to claim 1, wherein the second portion is rotatable with respect to the first portion by at least 180 degrees.

10. A device according to claim 9, wherein the second portion is rotatable with respect to the first portion by approximately 270 degrees.

11. A device according to claim 1, wherein said device is a videophone.

12. A portable image capture device including a first portion and a second portion, the second portion being rotatable with respect to the first portion, the second portion including a camera for image capture, the second portion being rotatable with respect to the first portion from a fist position to a second position, wherein said device includes a processing device responsive to rotation of said second portion with respect to said first portion from said first position to switch on said camera, said processing device being responsive to rotation of said second portion beyond a predetermined position to invert an image produced by said camera.

13. A mobile videophone including a main body portion and a camera housing which is rotatably mounted on the mail body portion, the main body portion being generally elongate and having a top, a lower end, two sides and a front surface on which a display is mounted, said housing being mount on one of said sides, the videophone including a processing device responsive to rotation of the camera housing with respect to the main body portion beyond a predetermined position to invert an image produced by the videophone.

14. A portable image capture device including a first portion and a second portion, the second portion being rotatable with respect to the first portion, the second portion including a camera for image capture, the camera including a lens, the first portion including a display for view images captured by the camera, the second portion being rotatable with respect to the first portion from a first position, in which the camera lens is protected by said first portion, to a second position in which the first portion does not protect the camera lens, the device including means for determining rotation of said second portion with respect to said first portion, the means for determining rotation being responsive to rotation of said second portion beyond a predetermined position to invert an image produced by said camera.

15. A method of capturing images, comprising:
providing a portable image capture device including a first portion and a second portion, the second portion being rotatable with respect to the first portion, the second portion including a camera for image capture, the camera including a lens, the first portion including a display for viewing images captured by the camera;
rotating the second portion with respect to the first portion from a first position, in which the camera lens is protected by said first portion, to a second position in which the first portion does not protect the camera lens; and
inverting an image produced by the camera if the second portion rotates with respect to the first portion beyond a predetermined position.

16. A portable image capture device including a first portion and a second portion, the second portion being rotatable with respect to the first portion, the second portion including a camera for image capture, the camera including a lens, the first portion including a display for viewing images capture by the camera, the second portion being rotatable with respect to the first portion from a first position, in which the camera lens is protected by the first portion, to a second position in which the first portion does not protect the camera lens, the device including a processor configured to control inversion of an image produced by the camera in response to rotation of the second portion with respect to the first portion.

17. A portable image capture device according to claim 16, wherein the processor is responsive to rotation of the second portion with respect to the first portion beyond a predetermined position.

18. A device according to claim 16, wherein the camera lens is protected by a protective portion of the first portion in the fist position.

19. A device according to claim 18, wherein the protective portion is rigidly mounted to the first portion.

20. A device according to claim 18, wherein the protective portion is integrally formed on the first portion.

21. A device according to claim 18, wherein the second portion is mounted to a side of the first portion, the second portion projecting from the side of the first portion and the protective potion also projecting from the side of the first portion.

22. A device according to claim 16, wherein the first portion is generally elongate having an upper end and a lower end, the second portion being mounted in the area of the upper end.

23. A device according to claim 22, wherein the first position is a position in which the camera faces in the direction of the upper end with respect to the lower end.

24. A device according to claim 16, wherein the processor is responsive to rotation of the second portion from the first position to switch on the camera.

25. A device according to claim 16, wherein the second portion is rotatable with respect to the first portion by at least 180 degrees.

26. A device according to claim 25, wherein the second portion is rotatable with respect to the first portion by approximately 270 degrees.

27. A device according to claim 16, wherein the device is a videophone.

28. A portable image capture device including a first portion and a second portion, the second portion being rotatable with respect to the fist portion, the second portion including a camera for image capture the second portion being rotatable with respect to the first portion from a first position to a second position, wherein the device includes a processor configured to switch on the camera in response to rotation of the second portion with respect to the first portion from the first position, and wherein the processor enables, in the case of rotation of the second portion with respect to the first portion, inversion of an image produced by the camera.

29. A portable image device according to claim 28, wherein the processor is responsive to rotation of the second portion with respect to the first portion beyond a predetermined position.

30. A mobile videophone including a main body portion and a camera housing which is rotatably mounted on the main body portion, the main body portion being generally elongate and having a top, a lower end, two sides and a front surface on which a display is mounted, the housing being rotatably mounted on one of the sides, wherein the videophone includes a processor enabling, in the case of rotation of the camera housing with respect to the main body portion, inversion of an image produced by the camera.

31. A mobile videophone according to clam 30, wherein the processor is responsive to rotation of the second portion with respect to the first portion beyond a predetermined position.

* * * * *

UNITED STATES PATENT AND TRADEMARK OFFICE
CERTIFICATE OF CORRECTION

PATENT NO. : 6,876,379 B1
DATED : April 5, 2005
INVENTOR(S) : Graham Fisher

It is certified that error appears in the above-identified patent and that said Letters Patent is hereby corrected as shown below:

Column 5,
Lines 39 and 67, please delete "fist" and insert therefore -- first --.

Column 6,
Line 10, please delete "mail" and insert therefore -- main --.
Line 13, please delete "mount" and insert therefore -- mounted --.
Line 21, please delete "view" and insert therefore -- viewing --.
Line 65, please delete "fist" and insert therefore -- first --.

Column 7,
Line 6, please delete "potion" and insert therefore -- portion --.
Line 28, please delete "fist" and insert therefore -- first --.

Column 8,
Line 1, after "capture" please add -- , --.
Line 9, please delete "fist" and insert therefore -- first --.
Line 23, please delete "clam 30" and insert therefore -- claim 30 --.

Signed and Sealed this

Sixth Day of December, 2005

JON W. DUDAS
*Director of the United States Patent and Trademark Office*